(12) United States Patent
Hennrich et al.

(10) Patent No.: US 6,186,160 B1
(45) Date of Patent: Feb. 13, 2001

(54) DEVICE FOR DRAWING OFF GASEOUS AND LIQUID MEDIA

(75) Inventors: Werner Hennrich, Fellbach; Andreas Richter, Remseck, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/428,009

(22) Filed: Oct. 27, 1999

(30) Foreign Application Priority Data

Nov. 12, 1998 (DE) .............................................. 198 52 156

(51) Int. Cl.⁷ .................................................. F16K 24/00
(52) U.S. Cl. .......................................... 137/174; 137/192
(58) Field of Search ..................... 137/174, 192

(56) References Cited

U.S. PATENT DOCUMENTS

| | | | |
|---|---|---|---|
| 1,897,398 | * | 2/1933 | Raymond .............................. 137/174 |
| 2,555,452 | * | 6/1951 | McIntyre .......................... 137/174 X |
| 4,082,106 | | 4/1978 | Butcher . |
| 4,269,217 | | 5/1981 | Flanagan et al. . |

FOREIGN PATENT DOCUMENTS 42 19 058 A1    1/1993  (DE) .
2173282         10/1986 (GB) .

* cited by examiner

*Primary Examiner*—Gerald A. Michalsky
(74) *Attorney, Agent, or Firm*—Marc Lorelli

(57) ABSTRACT

A device for drawing off gaseous and liquid media from an inflowing medium, in particular in a tank ventilation system, has the following features: a housing, a feed connection for introducing the inflowing medium into the housing, an outlet connection for drawing off the liquid medium at the lower side of the housing, an outlet connection for drawing off the gaseous medium at the upper side of the housing, a float chamber which is arranged between the outlet connections, a floating body which is arranged in the float chamber in a manner which allows it to be displaced in the longitudinal direction of the float chamber, a closing device for closing the float chamber with respect to the outlet connection for the liquid medium, a closing device for closing the float chamber with respect to the outlet connection for the gaseous medium, and a deflecting device for deflecting a longitudinal movement of the floating body within the float chamber into an opposite direction and for transmitting the said longitudinal movement to a tappet-shaped element for the purpose of opening the closing device of the float chamber with respect to the outlet connection for liquid media.

16 Claims, 2 Drawing Sheets

DEVICE FOR DRAWING OFF GASEOUS AND LIQUID MEDIA

CROSS REFERENCE TO RELATED APPLICATION

Priority is claimed with respect to German Application No. 198 52 156.1-43 filed in Germany on Nov. 12, 1998, the disclosure of which is incorporated herein by reference.

BACKGROUND OF THE INVENTION

1. Technical Field

The invention relates to a device for drawing off gaseous and liquid media from an inflowing medium.

2. Discussion

If both liquid and gaseous media can flow in a pipe either at the same time or independently of each other, it may, in various technical fields of application, be necessary or desirable for this pipe to be separated into two separate pipes, in one of which pipes only gaseous medium may flow. Both liquid, and also to a certain extent gaseous, medium may flow in the other pipe.

A separation of this type is, for example, necessary in the refuelling of motor vehicles where an activated carbon filter is to be protected from liquid fuel constituents and therefore no liquid constituents are to enter into the pipe leading to the activated carbon filter.

According to an item of prior art which is known from practical experience, an individual valve is used for this purpose. A separate pressure relief valve is used in order to reduce excess pressures in such a refuelling system or fuel-evaporation control system of a motor vehicle.

However, the necessity of having two valves operating independently of each other here is very disadvantageous because this results in unnecessary costs. Also, the reliability of the entire refuelling system in which valves of this type are installed, and the maintainability of the said system are adversely affected.

DE 42 19 058 A1 discloses a ventilation device for oil-feed devices which have a float which floats in vigorously foaming oil by virtue of the weight of said float being partially supported on a spring element and which is provided for closing the ventilation valve and therefore prevents leakage of oil.

U.S. Pat. No. 4,269,217 discloses a separating valve which is intended to be used to separate liquids from gases. For this purpose, the valve has a plurality of flow ducts and also a washer which rises from its seat when a medium flows in.

For further prior art as regards similar devices, reference is made to GB 21 73 282 A and U.S. Pat. No. 4,082,106.

SUMMARY OF THE INVENTION

The object of the present invention is to provide a device for drawing off gaseous and liquid media from an inflowing medium, which device is, on the one hand, very effective and reliable and, on the other hand, is cost-effective. The intention, in particular, is to ensure with the aid of such a device that only gas can flow out through an outlet thereof.

According to the invention, this object is achieved by the features mentioned in claim 1.

Because of the separate outlet connections for liquid and gaseous media, which can in each case be opened and closed by different closing devices which are separate from one another, it is possible, in an advantageous manner, to prevent liquid which enters into the float chamber via the feed connection from being able to enter into the outlet connection for the gaseous medium. It is therefore possible to separate off the liquid medium and for only gaseous materials to be able to pass through this outlet connection, as a result of which a device behind the outlet connection can be protected from liquid.

When a corresponding pressure is reached in the float chamber, it is possible also for gaseous medium to emerge through the outlet connection for the liquid medium in addition to the liquid medium flowing out of this connection, since the closing device for closing the float chamber with respect to the outlet connection for the liquid medium also opens at an equivalent pressure. This constitutes a rapid and simple option for reducing high pressures in the feed pipe or in the float chamber. The necessary separating-off of the liquid medium and the distribution of the flow of media remain, however, unaffected by this.

In this connection, the deflecting device having the element for opening the closing device of the float chamber with respect to the outlet connection for liquid media serves to the effect that, when there is a large quantity of liquid medium flowing in and an associated floating of the floating body within the float chamber, i.e. a movement upwards, this movement is deflected downwards and the outlet connection is thereby opened, as a result of which the liquid medium can very rapidly flow out of the outlet connection provided for this purpose. The rising of the liquid level in the float chamber therefore advantageously causes rapid opening of the outlet connection and an associated emptying of the float chamber.

A further advantage of the device according to the invention is the fact that it only operates when there is inflowing liquid or when there is an excess pressure, yet is completely insensitive to negative pressure.

The overall result is a device which merely requires a housing and is therefore more favourable both with regard to the costs and also with regard to installation.

Advantageous refinements and developments of the invention emerge from the subclaims and from the exemplary embodiment which is represented in terms of principle below with reference to the drawing.

DETAILED DESCRIPTIONS OF THE DRAWINGS

Figure 1:
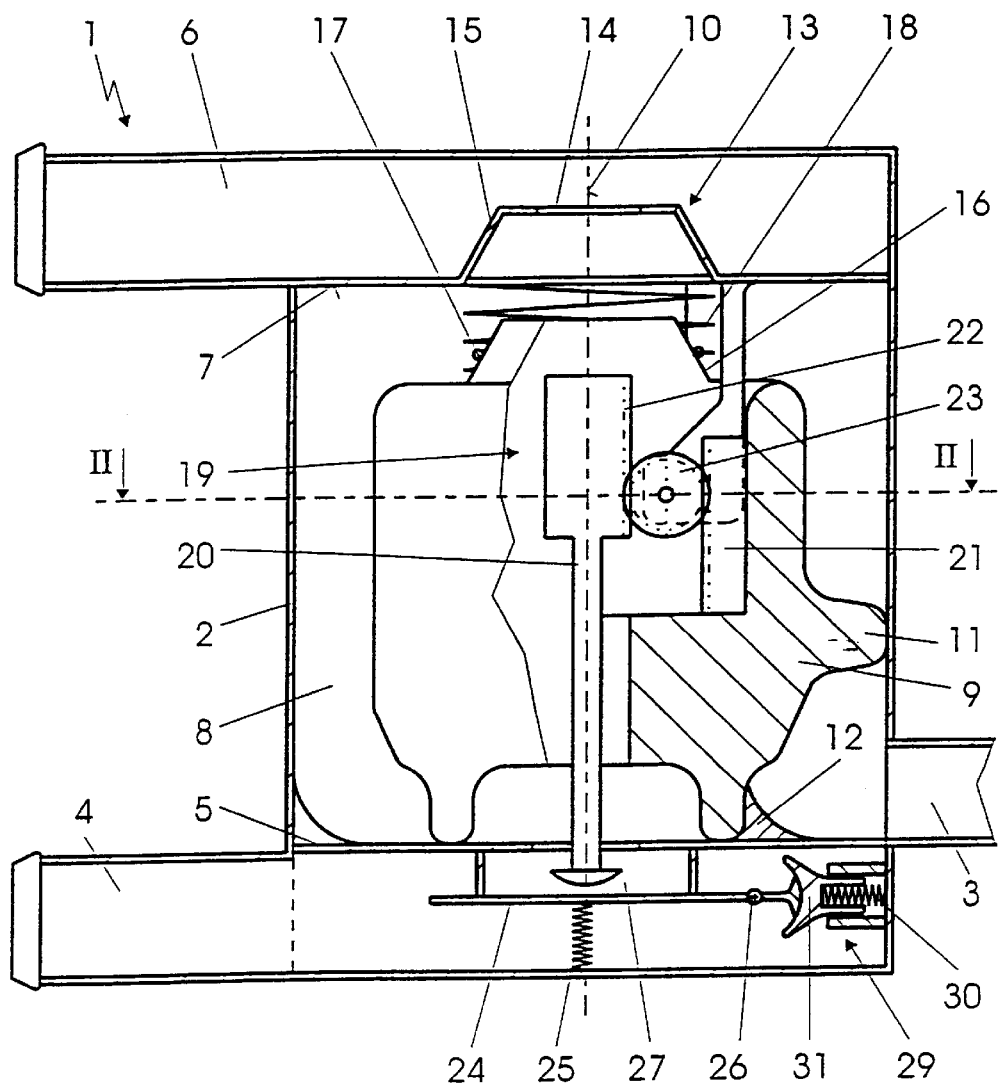
FIG. 1 shows a device according to the invention in a section along the line I—I from FIG. 2.

FIG. 1 shows a device 1 for drawing off gaseous and liquid media from an inflowing medium. For this purpose, the device 1 has a housing 2, a feed connection 3 for introducing the inflowing medium into the housing 2, an outlet connection 4 for drawing off the liquid medium at a lower side 5 of the housing 2, and also an outlet connection 6 for drawing off the gaseous medium at an upper side 7 of the housing 2. In the following, the outlet connection 4 for the liquid medium is therefore described as the lower outlet connection 4 and the outlet connection 6 for the gaseous medium is described as the upper outlet connection 6.

The device 1 may, for example, be installed in a tank ventilation system of a motor vehicle, for which purpose the upper outlet connection 6 would be connected to an activated carbon filter (not shown), whereas the lower outlet connection 4 would serve for recycling fuel into a fuel tank (likewise not shown). In this application, care should be taken to ensure that no fuel is passed to the activated carbon filter, since the latter would otherwise suffer damage.

Between the two outlet connections 4 and 6, the housing 2 forms a cylindrical float chamber 8 in which a hollow floating body 9 is arranged. The floating body 9 is displaceable along a longitudinal axis 10 of the float chamber 8 and is guided within the float chamber 8 by means of three guide pins 11 which extend radially outwards from the floating body 9 as far as the housing 2. The three guide pins 11 are in each case offset from one another by 120°; of course, it would also be possible to provide a greater number of guide pins 11 and to offset them correspondingly from one another. Therefore, when liquid medium flows into the float chamber 8, the hollow floating body 9 moves, because of its buoyancy, along the longitudinal axis 10 towards the outlet connection 6 or the upper side 7 of the housing 2.

In order to prevent the floating body 9 from tipping over when there is a strong flow of the liquid medium through the feed connection 3 into the float chamber 8, there is situated in the float chamber 8 in front of the floating body 9 a directing element 12 which is designed in a similar manner to a plough blade and distributes the flow of liquid into two partial flows. As a result, the liquid medium no longer strikes directly against the floating body 9, which could otherwise result in the latter tipping over.

Figure 2:
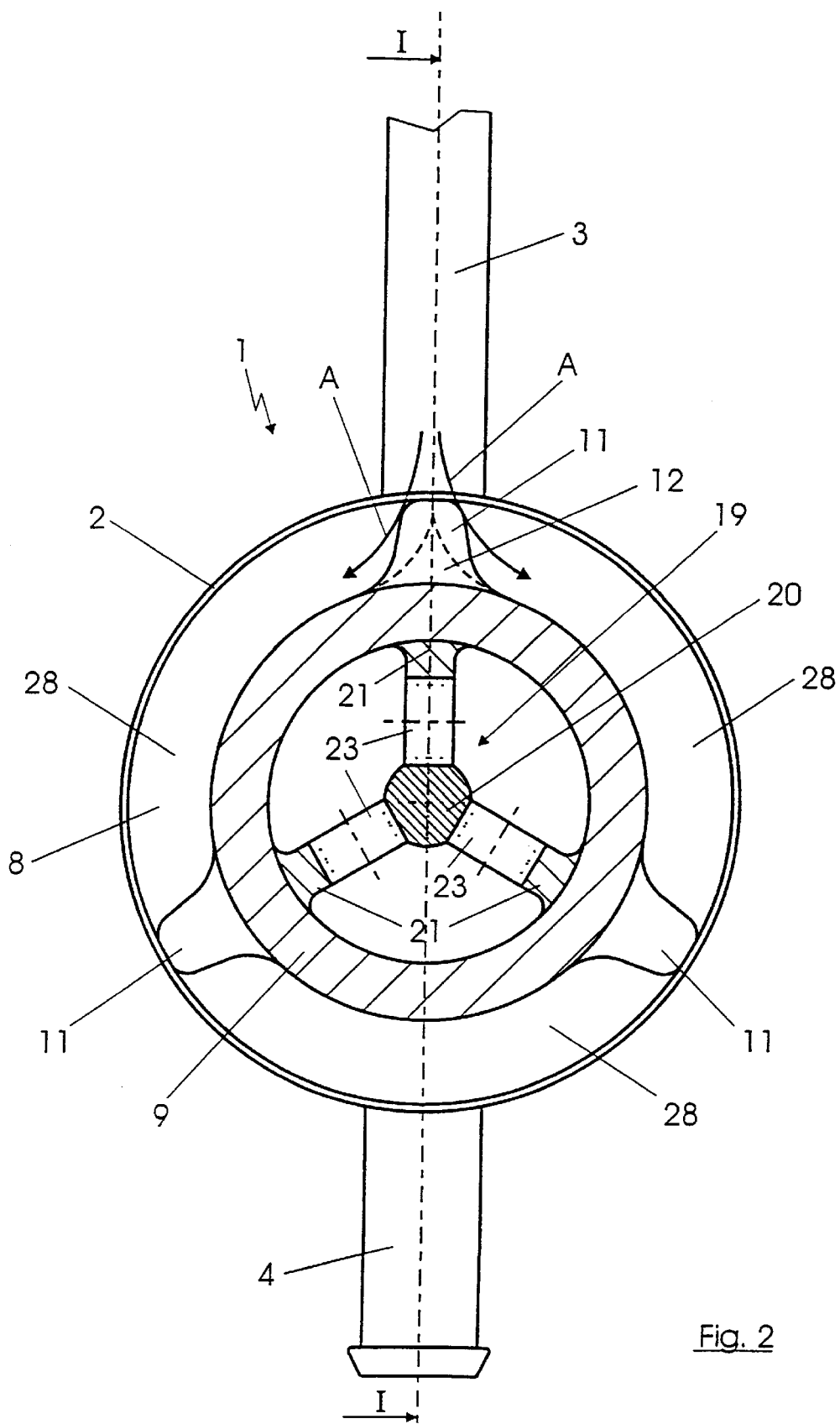
FIG. 2 shows a section along the line II—II from FIG. 1.

In FIG. 2 this distribution of the flow of liquid is represented by arrows A. In that region on the lower side 5 of the float chamber 8 which lies opposite the feed connection 3, the two partial flows again strike against one another, as a result of which the kinetic energy contained in the liquid is reduced. The directing element 12 is provided with a radius in this region in order to prevent the flow of liquid in the float chamber 8 from flowing into the corners of the housing 2, which would otherwise result in considerable frictional losses.

In order to be able to close the float chamber 8 with respect to the upper outlet connection 6, there is situated in the upper region of the float chamber 8 a closing device 13 which is designed as described below. First of all, the outlet connection 6 is connected to the float chamber 8 via an opening 14. The opening 14 is situated in a truncated-cone-shaped elevation 15 which is moulded into the outlet connection 6 from the float chamber 8. Gases can depart from the float chamber 8 through the opening 14 into the outlet connection 6. In order to be able to close the opening 14 and therefore the outlet connection 6, the floating body 9 has a corresponding truncated-cone-shaped elevation 16 which, when there is a longitudinal movement of the floating body 9 in the direction of the outlet connection 6, comes to lie against the truncated-cone-shaped elevation 15 and therefore closes the opening 14. This can prevent liquid from flowing into the outlet connection 6, since, when there is a corresponding rise in liquid in the float chamber 8, the floating body 9 floats because of its hollow design and closes the outlet connection 6 as described above.

In order to ensure a tight closure, the truncated-cone-shaped elevation 14 is provided with a sealing element which is designed as a sealing ring 17. In order to damp the striking together of the two truncated-cone-shaped elevations 15 and 16, a spring element 18 is situated between said elevations. In addition, the spring element 18, in this case a commercially available compression spring, serves to keep the opening 14 open even if the floating body 9 is moved upwards in the direction of the upper outlet connection 6 by slight vibrations, for example when driving over potholes. Therefore, even in such situations it is ensured that gases are drawn off through the outlet connection 6.

Within the floating body 9 there is arranged a deflecting device 19 which is provided for the purpose of reversing the longitudinal movement, which is caused by inflowing liquid, of the floating body 9 along the longitudinal axis 10 in the direction of the upper side 7 of the housing 2 into the opposite direction, and of transmitting the said longitudinal movement to an element 20 which belongs to the deflecting device 19, is designed in the form of a tappet and is arranged in the region of the longitudinal axis 10. The deflecting device 19 furthermore consists of three toothed racks 21 which are arranged around the circumference of the element 20 and are fixedly connected to the floating body 9. Toothed wheels 23 are situated in each case between the toothed racks 21 and the element 20, which likewise has a partial toothing 22, specifically in its upper region, which toothed wheels 23 are therefore in engagement both with the toothing 22 of the inner element 20 and also with the outer toothed racks 21.

The deflecting device 19 functions as follows: If the floating body 9 moves upwards because of the inflowing liquid, the three toothed racks 21 also move upwards and drive the three toothed wheels 23. This has the effect that the element 19 is also, via the toothing 22, caused to move longitudinally, specifically in the opposite direction, i.e. in the direction of the lower side 4 of the housing 1. A closing device 24 is situated there in the form of a flap 24 which closes the float chamber 8 with respect to the outlet connection 4. In order to keep the flap 24 closed in the unloaded, i.e. unpressurized state of the float chamber 8, there is arranged below said flap a spring element 25 which presses the flap 24 upwards and therefore keeps it in its closed position. The floating body 9 is thus moved upwards, i.e. when liquid flows into the float chamber 8, as a result of which the tappet-shaped element 20 is moved downwards, strikes against the flap 24 and opens the latter. The opening movement of the flap 24 takes place by means of a rotational movement thereof about a fastening point 26 which is fixed to the housing. This enables the liquid to flow into the outlet connection 4 via an opening 27 which is closed by the flap 24. If there is no liquid in the float chamber 8, the spring element 18 keeps the tappet-shaped element 20 in its rest position.

The three toothed racks 21 and the toothed wheels 23 interacting with them result in a guide for the tappet-shaped element 20 which, in addition, can also be guided in its lower region in a manner which is not shown. Furthermore, this also provides damping of the entire deflecting device to a certain extent. Of course, more or fewer toothed racks 21 and toothed wheels 23 could also be provided instead of three of them.

Instead of the toothed racks 21 and the toothed wheels 23, the deflecting device 19 can also be produced via a cable pull or similar elements, but this is not shown. Appropriate adaptation of the tappet-shaped element 20 would be necessary for this.

If a gaseous medium rather than a liquid one flows in through the feed connection 3 and a high pressure is thereby produced in the float chamber 8, the flap 24 likewise opens and the pressure can be reduced through the opening 27. Gas, as already described above, can also pass in the direction of the upper outlet connection 6 through passages 28 situated between the guide pins 11 of the floating body 9 and in this manner can depart from the float chamber 8 through the opening 14, which is the norm when the pressure in the float chamber 8 is less high. The closing device 24 on the lower side 5 of the housing 2 has merely to ensure safe relief of any excess pressure temporarily present in the float chamber 8.

In order to prevent the flap 24 from flapping in changing pressure or flow conditions in the float chamber 8, said flap is connected to the housing 2 via a hysteresis device 29 which is arranged in the outlet connection 4 on the side facing away from the opening 27. In this connection, the hysteresis device 29 has a spring element 30 which is supported on the housing 2 and presses a pressure element 31 against the flap 24. The pressure element 31 and the flap 24 are in each case curved on the sides which are directed towards one another, so that the flap 24 can be rotated with respect to the pressure element 31. The pressure element 31 is of concave design here and the flap 24 is correspondingly of convex design in its region which faces the pressure element 31, so that a sliding movement can take place. The pressure applied via the spring element 30 causes friction between the curved surfaces of the flap 24 and of the pressure element 31, which friction permits only a delayed closing of the flap 24. The flap 24 therefore remains open for a certain time even if the flow of liquid or the excess pressure in the float chamber 8 has already been reduced. Complete emptying of the float chamber 8 is therefore ensured.

Various opening and closing pressures of the corresponding openings of the device 1 can be set by appropriate dimensioning of the spring elements 18, 25 and 30.

While the above description constitutes the preferred embodiment of the invention, it will be appreciated that the invention is susceptible to modification, variation, and change without departing from the proper scope or fair meaning of the accompanying claims.

What is claimed is:

1. A device for drawing off gaseous and liquid media from an inflowing medium, in particular in a tank ventilation system, said device comprising:
    a housing (2) having an upper side (7) and a lower side (5),
    a feed connection (3) for introducing the inflowing medium into the housing (2),
    a first outlet connection (4) for drawing off the liquid medium at the lower side (5) of the housing (2),
    a second outlet connection (6) for drawing off the gaseous medium at the upper side (7) of the housing (2),
    a float chamber (8) which is arranged between the first and second outlet connections (4, 6),
    a floating body (9) which is arranged in the float chamber (8) in a manner which allows it to be displaced in the longitudinal direction of the float chamber (8),
    a first closing device (24) for closing the float chamber (8) with respect to the first outlet connection (4) for the liquid medium,
    a second closing device (13) for closing the float chamber (8) with respect to the second outlet connection (6) for the gaseous medium, and
    a deflecting device (19) for deflecting a longitudinal movement of the floating body (9) within the float chamber (8) into an opposite direction and for transmitting the said longitudinal movement to a tappet-shaped element (20) for the purpose of opening the first closing device (24) of the float chamber (8) with respect to the first outlet connection (4) for liquid media.

2. The Device according to claim 1, wherein the floating body (9) is of at least partially hollow design, and the deflecting device (19) is arranged within the floating body (9).

3. The Device according to claim 2, wherein the tappet-shaped element (20) is guided in the lower region of the float chamber (8).

4. The Device according to claim 1, wherein the deflecting device (19) comprises a toothed rack (21) which is connected to the float chamber (8) and is in engagement with a toothed wheel (23), the element (20) being provided with a toothing (22) for the purpose of opening the first closing device (24) and being in engagement with the toothed wheel (23).

5. The Device according to claim 1, wherein element (20) is arranged at least approximately in the region of the longitudinal axis (10) of the floating body for the purpose of opening the first closing device (24), and wherein the deflecting device (19) comprises three outer toothed racks (22), which are arranged around the circumference of element (20), an inner toothed rack (21) connected to the float chamber (8) and three toothed wheels (23), which are in each case in engagement with an inner toothed rack (21) and the outer toothed racks (22).

6. The Device according to claim 1, wherein the first closing device includes a flap (24) for closing the float chamber (8) with respect to the first outlet connection (4) for the liquid medium, said flap is held in its closed position by a spring element (25) which acts counter to the tappet-shaped element (20).

7. The Device according to claim 1, wherein the first closing device (24) includes a hysteresis device (29) for closing the float chamber (8) with respect to the first outlet connection (4) for the liquid medium.

8. The Device according to claim 7, wherein the hysteresis device (29) has a pressure element (31) which is pressed against a flap (24) by a spring element (30) and on its side which faces the flap (24) is of curved design, and the flap (24) being of curved design on its side which faces the pressure element (31).

9. The Device according to claim 1, wherein the second closing device (13) has a truncated-cone-shaped elevation (15) formed by the float chamber (8) for the purpose of closing the float chamber (8) with respect to the second outlet connection (6) for the gaseous medium, the truncated-cone-shaped elevation (15) includes an opening (14) formed therein, the truncated-cone-shaped elevation can be closed by a mating elevation (16) on the floating body (9).

10. A device according to claim 9, further comprising a spring element (18) disposed between the truncated-cone-shaped elevation (15) of the float chamber (8) and the mating elevation (16) of the floating body (9).

11. A device according to claim 9, further comprising a sealing element (17) arranged on the mating elevation (16) of the floating body (9).

12. A device according to claim 9, wherein said deflecting device (19) is disposed within said float chamber (8).

13. A device according to claim 1, wherein the floating body (9) is supported in the float chamber (8) by radially outwardly extending guide pins (11), passages (28) being situated between the guide pins (11).

14. A device according to claim 1, further comprising a directing element (12) arranged in the region of the inflowing medium of the feed connection (3) into the float chamber (8) for the purpose of distributing the flow of media into the float chamber (8).

15. A device for drawing off gaseous and liquid media from an inflowing medium, in particular in a tank ventilation system, said device comprising:
 a housing (2) having an upper side (7) and a lower side (5),
 a feed connection (3) for introducing the inflowing medium into the housing (2),
 a first outlet connection (4) for drawing off the liquid medium from the housing (2),
 a second outlet connection (6) for drawing off the gaseous medium from the housing (2),
 a chamber (8) which is arranged between the first and second outlet connections (4, 6),
 a body (9) which is arranged in the chamber (8) in a manner which allows it to be displaced in a first specified direction,
 a first closing device (24) for closing the chamber (8) with respect to the first outlet connection (4) for the liquid medium,
 a second closing device (13) for closing the chamber (8) with respect to the second outlet connection (6) for the gaseous medium, and
 a device (19) arranged within said body for transmitting movement of the body (9) in the first specified direction into movement of an element (20) in a second specified direction to open the first closing device (24) of the float chamber (8) with respect to the first outlet connection (4) for liquid media.

16. The device as set forth in claim 15, wherein said first specified direction is opposite from said second specified direction.

* * * * *